United States Patent [19]

Brakebill

[11] 4,202,524

[45] May 13, 1980

[54] VALVE POSITIONER AND METHOD OF MAKING THE SAME

[75] Inventor: Harold G. Brakebill, Concord, Tenn.

[73] Assignee: Robertshaw Controls Company, Ricmond, Va.

[21] Appl. No.: 908,537

[22] Filed: May 22, 1978

[51] Int. Cl.[2] .......................... F16K 31/12; F02M 25/06

[52] U.S. Cl. .......................... 251/28; 123/119 A

[58] Field of Search .......................... 251/28; 123/119 A

[56] References Cited

U.S. PATENT DOCUMENTS

| | | | |
|---|---|---|---|
| 3,931,813 | 1/1976 | Horie et al. | 123/119 A |
| 3,974,807 | 8/1976 | Nohira et al. | 123/119 A |
| 4,033,308 | 7/1977 | Hayashi et al. | 123/119 A |
| 4,047,510 | 9/1977 | Nakajima et al. | 123/119 A |
| 4,056,083 | 11/1977 | Wakita | 123/119 A |
| 4,066,056 | 1/1978 | Nohira et al. | 123/119 A |
| 4,116,182 | 9/1978 | Bradshaw | 123/119 A |
| 4,137,874 | 2/1979 | Otsubo et al. | 123/119 A |

*Primary Examiner*—Martin P. Schwadron

*Assistant Examiner*—A. Michael Chambers

*Attorney, Agent, or Firm*—Candor, Candor & Tassone

[57] ABSTRACT

A self-contained valve positioner having a single valve positioner housing including an actuator portion and having a pneumatically operated actuator unit therein carrying a main valve member to position the main valve member relative to a main valve seat in a valve unit in relation to the magnitude of a single pneumatic signal directed to the valve positioner and being utilized as the fluid source therein for pneumatically operating the actuator unit, the housing including a pilot valve portion and the actuator unit having a pilot valve relay disposed in the pilot valve portion and that initially receives the pneumatic signal and causes the signal to operate the actuator unit to progressively open the valve member as the signal being directed to the valve positioner progressively increases from a first value to a second value and thereafter to progressively close the valve member as the signal being directed to the value positioner progressively increases from the second value to a third value.

2 Claims, 2 Drawing Figures

VALVE POSITIONER AND METHOD OF MAKING THE SAME

BACKGROUND OF THE INVENTION

1. Field of the Invention

This invention relates to an improved self-contained pneumatically operated valve positioner and to a method of making the same.

2. Prior Art Statement

It was known to applicant to provide a vacuum operated valve positioner for positioning a valve member relative to a valve seat in relation to the magnitude of a pneumatic singal directed to the positioner.

It was also known to applicant that engine control systems for internal combustion engines have been provided wherein each has an exhaust gas recirculation valve for taking part of the exhaust gas of the internal combustion engine and diverting the same into the intake manifold to be again utilized in the internal combustion engine for pollution control purposes. However, the degree of exhaust gas recirculation must be regulated according to various engine parameters, such as the RPM speed of the engine, the value of the manifold absolute pressure, etc., and it was suggested by others that it would be desirable to provide such a control system wherein the exhaust gas recirculation valve is pressure operated and pneumatically operated control means is provided for increasing a pressure signal from the engine air pump pressure supply to the valve as the engine RPM speed increases from a first value to a second value and for thereafter decreasing the pressure signal from the supply to the valve as the engine RPM speed further increases from the second value thereof to a third value, the control means producing the signal in substantially the same manner but at different values for different levels of vacuum at the manifold vacuum source thereof.

Thus, applicant previously invented such a control system and device as described and claimed in the copending patent application, Ser. No. 800,211, filed May 25, 1977 , now U.S. Pat. No. 4,099,539, to control the operation of a pressure operated valve positioner as set forth in applicant's other copending patent application, Ser. No. 800,299, filed May 25, 1977, now Pat. No. 4,143,850.

However, it was subsequently suggested to applicant that it was desired to have such an exhaust gas recirculation valve be regulated only according to one engine parameter, namely, the value of the manifold absolute pressure and it was further suggested that manifold vacuum operate part of the valve positioner and that carburetor port vacuum operate another part of the valve positioner so that both parts would cooperate together to produce the desired operation.

Therefore, rather than use the above suggested two separate pneumatic sources, applicant invented a self-contained pneumatically operated valve positioner that operates only in response to one pneumatic signal source and which will function for the above purpose, such invention being disclosed and claimed in the copending patent application, Ser. No. 908,209, filed May 22, 1978.

This invention also provides such a valve positioner, the valve positioner utilizing a relay means in the actuator unit thereof.

SUMMARY OF THE INVENTION

It is a feature of this invention to provide a self-contained valve positioner that will progressively open a valve member relative to its valve seat as a pneumatic signal to the valve positioner increases from a first value to a second value and thereafter will progressively close the valve member relative to its valve seat as the same pneumatic signal to the valve positioner progressively increases from that second value to a third value thereof.

In particular, such a valve positioner is adapted to be an exhaust gas recirculation valve unit for internal combustion engine wherein the pneumatic signal being directed thereto is taken from the vacuum manifold of the engine so that as the vacuum value changes from a first value thereof to a second value thereof, the valve unit progressively opens to direct engine exhaust gas back to the engine at a rate in relation to the vacuum value at the vacuum manifold. However, as the vacuum value changes from that second value thereof to a third value thereof, the valve member of the valve unit will progressively close toward its valve seat to reduce the rate of exhaust gas recirculation to the engine for the reasons fully set forth in the aforementioned copending U.S. patent applications.

Thus, one embodiment of this invention provides a self-contained valve positioner having a single valve positioner housing including an actuator portion and having a pneumatically operated actuator means therein carrying a main valve member to position the main valve member relative to a main valve seat in a valve unit in relation to the magnitude of a single pneumatic signal directed to the valve positioner and being utilized as the fluid source therein for pneumatically operating the actuator means, the housing including a pilot valve portion and the actuator means having pilot value relay means disposed in the pilot valve portion and toinitially receive the pneumatic signal and cause the signal to operate the actuator means to progressively open the valve member as the signal being directed to the valve positioner progressively increases from a first value to a second value and thereafter to progressively close the valve member as the signal being directed to the value positioner progressively increases from the second value to a third value.

Accordingly, it is an object of this invention to provide an improved self-contained valve positioner having one or more of the novel features of this invention as set forth above or hereinafter shown or decribed.

Another object of this invention is to provide a method of making such self-contained valve positioner, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
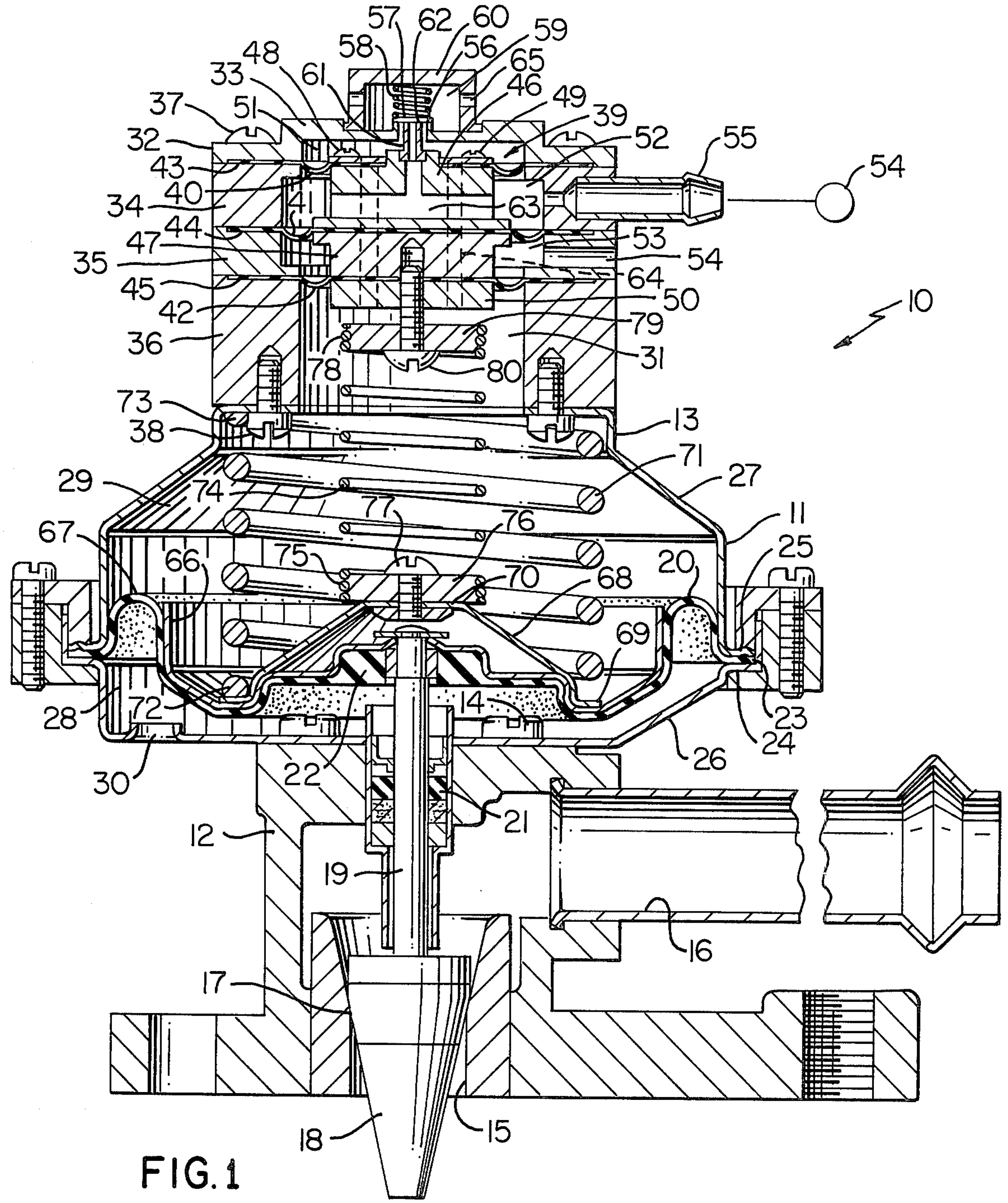
FIG. 1 is a cross-sectional view illustrating the improved valve positioner of this invention.

While the various features of this invention are hereinafter described and illustrated as being particularly adapted to provide a valve positioner to be utilized as an exhaust gas recirculation valve means for an internal combustion engine, it is to be understood that the various features of this invention can be utilized singly or in any combination thereof to provide a valve positioner for other devices as desired.

Therefore, this invention is not to be limited to only the embodiment illustrated in the drawings, because the drawings are merely utilized to illustrate one of the wide variety of uses of this invention.

Referring now to FIG. 1, the improved valve positioner of this invention is generally indicated by the reference numeral 10 and comprises a housing means 11 formed from a valve unit 12 and a pneumatically operated actuator unit 13 suitably secured together, such as by fastening means 14.

The valve unit 12 has an inlet 15 separated from an outlet 16 by a frusto-conical valve seat 17 adapted to be opened and closed by a main valve member 18 carried by a valve stem or actuator rod 19 that is secured to a flexible diaphragm 20 of the actuator unit 13 so that opening and closing movement of the valve member 18 relative to the valve seat 17 is determined by the position of the diaphragm 20 in the actuator unit 13 in a manner hereinafter set forth, the valve stem 19 passing through suitable seal means 21 carried by the valve unit 12.

The flexible diaphragm 20 has its inner periphery 22 secured to the valve stem 19 and its outer periphery 23 clamped between the outer peripheral portions 24 and 25 of a pair of cup-shaped housing members 26 and 27 that define part of the housing means for the actuating unit 13 whereby the diaphragm 20 cooperates with the housing part 26 to define a chamber 28 therebetween and cooperates with the housing part 27 to define a chamber 29 therebetween.

The chamber 28 is adapted to be interconnected to the atmosphere by an opening 30 formed in the housing part 26 while the chamber 29 is disposed in fluid communication with a chamber 31 provided in a housing stack 32 formed from a plurality of housing parts 33, 35, 35 and 36 secured together in stacked relation by fastening means 37 and being secured to the housing part 27 by fastening means 38. A relay means of the force balance type, that is generally indicated by the reference numeral 39, forms part of the actuator unit 13, is carried by the housing stack 32 and comprises three flexible diaphragms 40, 41 and 42 disposed in stacked spaced relation with the diaphragm 40 having its outer peripheral portion 43 disposed between the housing parts 33 and 34, the outer peripheral portion 44 of the diaphragm 41 being held between the housing parts 34 and 35 and the outer peripheral portion 45 of the diaphragm 42 being held between the housing parts 35 and 36.

A pair of spacers 46 and 47 are respectively disposed on opposite sides of the diaphragm 41 and are secured thereto by fastening means 48 that clamp outer reinforcing members 49 and 50 respectively to the outboard sides of the diaphragms 40 and 42 whereby the spacer 46 is disposed between the diaphragms 40 and 41 and the spacer 47 is disposed between the diaphragms 41 and 42.

In this manner, the diaphragm 40 forms a chamber 51 with the housing stack 32, the diaphragms 40 and 41 define a chamber 52 therebetween with the housing stack 32 and the diaphragms 41 and 42 define a chamber 53 therebetween in cooperation with the housing part 35 while the diaphragm 42 separates the interconnected chambers 29, 31 from the chamber 53 as illustrated.

The chamber 53 is interconnected to the atmosphere by a passage 54′ passing through the housing part 35.

The chamber 52 is adapted to be interconnected to a vacuum source 54 by an inlet nipple 55 for a purpose hereinafter described.

The chamber 51 leads to a tubular valve seat 56 that is normally closed by a valve member 57 urged to its closed position by a compression spring 58 disposed in a chamber 59 of a cup-shaped housing member 60 secured to the housing part 33, the tubular valve seat 56 being formed as part of the housing part 33.

The spacer 46 of the relay means 39 has a tubular member 61 projecting upwardly therefrom and through the diaphragm 40 to be received within the tubular valve seat 56 and have its open end 62 adapted to engage against the valve member 57 to also be closed thereby when the relay 39 is disposed in the position illustrated in FIG. 1 for a purpose hereinafter described, the tubular member 61 leading to a passage means 63 formed in the spacer 46 that is disposed in fluid communication with the chamber 52.

The members 49, 40, 46, 41, 47, 42 and 50 of the relay means 39 have a plurality of passages 64 passing therethrough so as to fluidly interconnect the chamber 51 with the chamber 31 for a purpose hereinafter described.

The chamber 59 of the cup-shaped housing part 60 is interconnected to the atmosphere by suitable openings 65 formed therein.

A diaphragm cup or reinforcing member 66 is carried by the diaphragm 20 on the side 67 thereof and is fastened to the stem 19 as illustrated.

A bracket member 68 is disposed in the chamber 29 and has an annular flange 69 bearing against the diaphragm cup 66 while a central portion 70 thereof projects in a spaced manner above the diaphragm cup 66.

A coiled compression spring 71 is disposed in the chamber 29 and has one end 72 bearing against the annular flange 69 of the bracket 68 to hold the bracket 68 against the diaphragm cup 66 while the other end 73 of the spring 71 bears against the housing part 27 to thereby not only to tend to urge the bracket 68 against the diaphragm cup 66, but also to urge the diaphragm 20 downwardly to the position illustrated in FIG. 1 where the valve member 18 is closed against the valve seat 17.

A coiled tension spring 74 is concentrically disposed within the coiled compression spring 71 and has one end 75 fastened to a spring retainer 76 that is secured to the central part 70 of the bracket 68 by a threaded fastening member 77. The other end 78 of the tension spring 74 is secured to a spring retainer 79 that is adjustably fastened to relay 39 by a threaded fastening member 80.

In this manner, the force of the tension spring 74 not only tends to pull the relay 39 downwardly but also tends to pull the diaphragm 20 upwardly.

The forces of the springs 71 and 74 are so selected in relation to the effective areas of the diaphragms 20, 40, 41 and 42 that the valve positioner 10 can be made by the method of this invention to operate in a manner now to be described.

The valve positioner 10 can be utilized as an exhaust gas recirculation valve means for an internal combustion engine and the chamber 52 of the relay means 39 can be interconnected to the engine manifold 54.

In any event, when the chamber 52 is at atmospheric condition, the force of the compression spring 71 maintains the valve member 18 in a closed position against the valve seat 17 and the force of the tension spring 74 has pulled the relay 39 downwardly so that the end 62 of the tubular valve member 61 is spaced below the valve member 57 so that atmosphere from the chamber 52 is adapted to enter the chamber 51 through the opened tubular member 61 and, thus through the openings 64 to the interconnected chambers 29, 31 whereby the chambers 29, 31 are at atmospheric condition.

However, as the vacuum condition in the vacuum source 54 begins to operate and evacuate the chamber 52, such evacuation likewise takes place in the chamber 51 because of the open tubular member 61 and through the openings 64, begins to evacuate the interconnected chambers 29, 31 whereby a pressure differential begins to act not only across the diaphragm 20 in a direction to tend to move the diaphragm 20 upwardly in FIG. 1 in opposition to the force of the compression spring 71, but also tends to act across the diaphragms 41, 41, and 42 in a manner to tend to pull the relay means 39 upwardly in opposition to the force of the tension spring 74.

Figure 2:
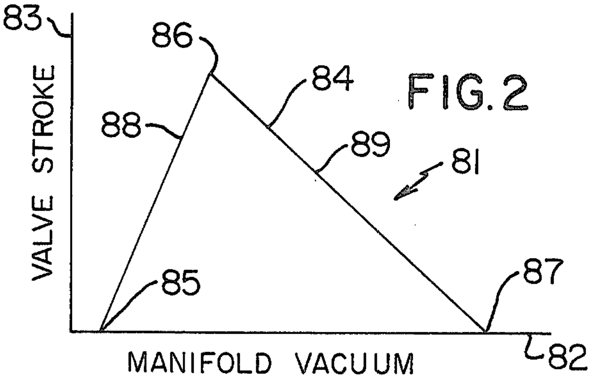
FIG. 2 is a graph illustrating the valve stroke operation of the valve positioner of FIG. 1 as the vacuum signal thereto increases through a certain range thereof.

As illustrated in FIG. 2, a schematic graph is provided which is generally indicated by the reference numeral 81 wherein the X axis 82 represents the manifold vacuum value as the same increases in inches of mercury from left to right and the Y axis 83 represents the opening stroke of the valve member 18 relative to the valve seat 17 in tenths of inches, the full line 84 of FIG. 2 representing the movement of the valve member 18 relative to the valve seat 17 during the operation of the valve positioner 10 of this invention.

For example, the forces of the springs 71 and 74, as well as the diaphragms 41, 41, and 42 of the relay means 39, are so chosen that the diaphragm 20 will not begin to move upwardly in opposition to the force of the compression spring 71 until the vacuum value in the chambers 29, 31 is approximately one inch Hg as represented by the point 85 on the graph 81 of the FIG. 2. As the vacuum value at the source 54, and thus, in the actuator chambers 29, 31 of the actuator unit 13 increases from approximately one inch Hg to approximately 5 inches Hg as represented by the point 86 on the graph 81, the diaphragm 20 progressively moves upwardly to open the valve member 18 relative to the valve seat 17 to its fully opened position wherein the maximum amount of exhaust gas recirculation from the inlet 15 to the outlet 16 is provided for the particular combustion engine for which the valve positioner 10 is designed.

As the vacuum value further increases from approximately 5 inches Hg to approximately 15 inches Hg as represented by the point 87 on the graph 81, the diaphragm 20 is forced back downwardly by the compression spring 71 as the increasing pressure differential acting across the effective areas of the diaphragms 40, 41, and 42 of the relay 39 in opposition to the force of the tension spring 74 has moved the relay 39 upwardly to cause the tubular member 61 to open the valve member 57 away from the valve seat 62 and thereby bleed air into the chamber 51 and, thus, through the passages 64 to the chamber 29, 31, to reduce the vacuum value therein in a manner to permit the diaphragm 20 to progressively close the valve member 18 toward the valve seat 17 until the same is fully seated when the vacuum value in the chamber 52 is approximately 15 inches Hg. A reverse in vacuum value from 15 inches Hg to one inch Hg causes the valve stroke from point 87 to point 85 along the line 84.

Therefore, it can be seen that the portion 88 of the line 84 between the points 85 and 86 on the graph 81 is substantially linear so that the valve member 18 moves relative to the valve seat 17 in a progressively increasing opening manner as the vacuum value in the chamber 52 of the actuator unit 13 increases from a first value thereof to a second value thereof and thereafter the valve member 18 is moved toward the valve seat 17 in substantially a linear manner as represented by the portion 89 of the line 84 on the graph 81 between the points 86 and 87 as the vacuum value in the chamber 52 of the actuator unit 13 further progressively increases from the second value thereof to a third value thereof.

Therefore, it can be seen that by making the valve positioner 10 according to the method of this invention, and by selecting the spring rates for the springs 71, 74 as well as the effective areas of the diaphragms 40, 41 and 42 of the relay means 39, an improved valve positioner 10 of this invention will be provided wherein the same will cause the actuator means 13 thereof to progressively open the valve member as the signal thereto progressively increases from a first value to a second value and thereafter to progressively close the valve member as the signal progressively increases from the second value to a third value. In this manner, the amount of fluid permitted to flow through the valve unit thereof progressively increases as the valve of the signal progessively increases from the first value thereof to the second value thereof and then progressively decreases as the value of the signal further progressively increases from the second value thereof to the third value thereof and such an arrangement has been found to be satisfactory for controlling the exhaust gas recirculation for an internal combustion engine for an automobile or the like.

Accordingly, not only does this invention provide an improved valve positioner, but also this invention provides an improved method of making such a valve positioner or the like.

While the form and method of this invention now preferred have been illustrated and described as required by the Patent Statute, it is to be understood that other forms and method steps can be utilized and still fall within the scope of the appended claims.

What is claimed is:

1. In a self-contained valve positioner having a single valve positioner housing including an actuator portion and having a pneumatically operated actuator means therein carrying a main valve member to position said main valve member relative to a main valve seat in a valve unit in relation to the magnitude of a single pneumatic signal directed to said valve positioner and being utilized as the fluid source therein for pneumatically operating said actuator means includes a main flexible diaphragm operatively interconnected to said main valve member and movable in relation to a pressure differential across the main flexible diaphragm, the improvement wherein said single valve positioner housing includes a pilot valve portion and wherein said pilot valve portion has pilot valve relay means disposed therein, said relay means of said pilot valve portion having a plurality of flexible diaphragms, one of said relay means diaphragms and said main flexible diaphragm being spaced from each other to define a chamber therebetween, said relay means having passage means to direct at least a portion of said signal to said chamber to pneumatically move said valve member, said relay means receive said pneumatic signal and cause said signal to operate said actuator means in a manner to progressively open said valve member as said signal being directed to said valve positioner progressively increases from a first value to a second value and thereafter to progressively close said valve member as said signal being directed to said valve positioner progressively increases from said second value to a third value, biasing means in said chamber biasing said valve member to a closed position when said signal is said first value, tension spring means in said chamber having opposed ends operatively interconnected to said main flexible diaphragm and one of said relay means diaphragms biasing said relay means to a position allowing said pnematic signal to communicate with said first chamber to open said valve member as said signal progressively increases from said first value to said second value, valve means biased to open by said relay means to reduce the pressure differential across said main flexible diaphragm when said signal increases to said third value to allow said valve to close by said biasing means.

2. A valve positioner as set forth in claim 1 and wherein said biasing means includes a compression spring disposed in said chamber and having opposed ends, one of said opposed ends of said spring bearing against said housing and the other of said ends acting on said main flexible diaphragm.

* * * * *